United States Patent Office.

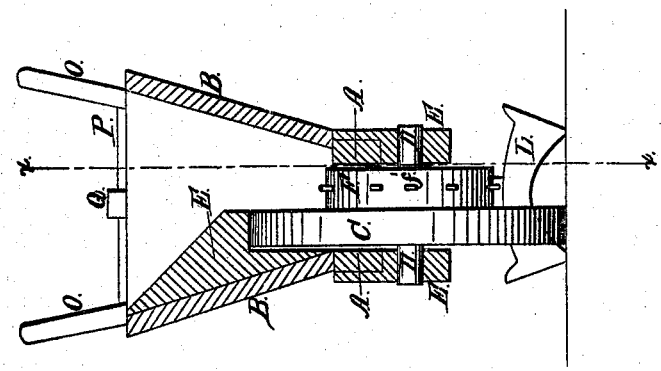
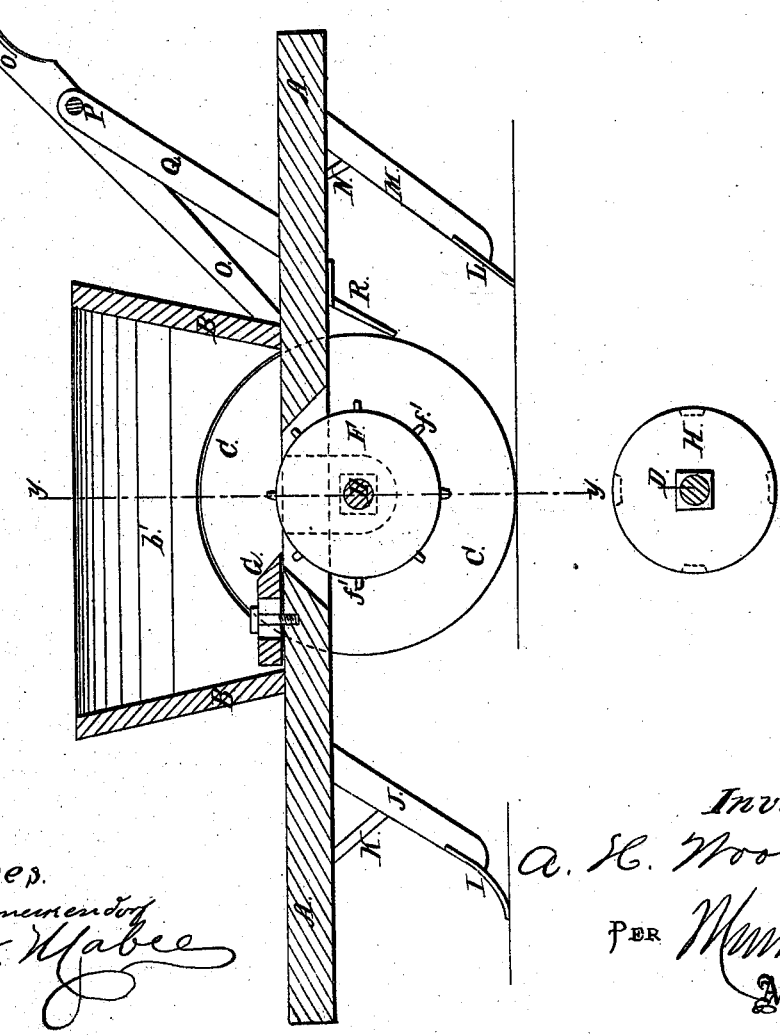

A. H. WOOTTON, OF BARTOW, GEORGIA.

Letters Patent No. 95,062, dated September 21, 1869.

---

IMPROVEMENT IN COMBINED CORN AND COTTON-PLANTER.

---

The Schedule referred to in these Letters Patent and making part of the same.

---

*To all whom it may concern:*

Be it known that I, A. H. WOOTTON, of Bartow, in the county of Jefferson, and State of Georgia, have invented a new and improved Combined Cotton and Corn-Planter; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved machine, taken through the line x-x, fig. 2.

Figure 2 is a vertical cross-section of the same, taken through the line y-y, fig. 1.

Figure 3 is a side view of the corn-dropping wheel.

Similar letters of reference indicate corresponding parts.

My invention has for its object to furnish a simple, convenient, and effective machine, which shall be so constructed and arranged that it may be easily adjusted for use, for planting cotton-seed or corn, as may be desired; and It consists in the construction and combination of the various parts, as hereinafter more fully described.

A represents the beam of the machine, the middle part of which is made wide, to serve as the frame of the machine.

The middle part of the beam A is cut away, to receive the drive and dropping-wheels, the part of said cut or slot that receives the drive-wheel being made longer than the other part that receives the dropping-wheel.

B is the hopper, which is attached to the upper side of the middle part of the beam A, so as to cover the slot or opening through said beam.

The side of the hopper that receives the drive-wheel is made thick, or has a block, b', attached to it, as shown in figs. 1 and 2, to cover the face of the said drive-wheel, and prevent the seed placed in said hopper from coming in contact with the said face of the said wheel, and thus clogging said wheel, or being carried out by it.

C is the drive-wheel, which is securely attached to the axle D, so as to carry the said axle with it in its revolution.

The journals of the axle D revolve in bearings in supports E, attached to the beam A.

F is the wheel for dropping cotton-seed, which is securely attached to the axle D, so as to be carried around with said axle in its revolution.

To the face of the wheel F, at suitable distances apart, are attached forks, prongs, or teeth f', which take hold of the cotton-seed in the hopper and draw it out.

G is an adjustable sliding gauge, attached to the beam A, so as to cover that end of the opening or slot in the said beam through which the seed is carried out by the dropping-wheel, to regulate the amount of seed to be planted.

When the machine is to be used for planting corn, the wheel F is removed and replaced with the wheel H, in the face of which are formed holes or recesses, of such a size as to contain enough corn to be dropped at once.

I is the plow that opens the furrow, to receive the seed, and which is secured to the lower end of the standard J, the upper end of which is attached to the beam A.

The standard J is strengthened and the draught-strain supported by a brace-rod, K, attached to the said standard and to the beam A, as shown in fig. 1.

The seed is covered by the plow L, the lower edge of which is made broad and is concaved, as shown in fig. 2, so as to cover the seed, and leave the covering-dirt in the form of a ridge.

The plow L is attached to the lower end of the standard M, the upper end of which is attached to the rear part of the beam A, and which is strengthened, and the draught-strain supported, by a brace-rod, N, attached to the standard M and to the beam A, as shown in fig. 1.

O are the handles, the lower ends of which are attached to the beam A, and the upper parts of which are connected by a round or cross-bar, P.

The handles O are strengthened by a brace, Q, the upper end of which is attached to the round or cross-bar P, and the lower end of which is attached to the beam A.

R is a scraper, which is attached to the lower side of the beam A, just in the rear of the drive-wheel C, to scrape off the dirt that may adhere to said wheel, to prevent said wheel from becoming clogged by the dirt carried up by it into the recess in the hopper B b', in which it works.

Having thus described my invention,

What I claim as new, and desire to secure by Letters Patent, is—

1. Forming a recess in the thickened side of the hopper B, to receive the upper part of the drive-wheel C, substantially as herein shown and described, and for the purpose set forth.

2. The combination and arrangement of the axle D, drive-wheel C, and dropping-wheel F f', or H, with the slotted beam A and hopper B b', substantially as herein shown and described, and for the purpose set forth.

3. The combination and arrangement of the slotted beam A, hopper B b', axle D, drive-wheel C, dropping-wheel F f', or H, furrowing-plow I J K, scraper R, covering-plow L M N, and handles O P Q, with each other, substantially as herein shown and described, and for the purpose set forth.

A. H. WOOTTON.

Witnesses:
GEORGE PETTUS,
E. N. MURPHEY.